June 4, 1946.  V. E. HOFMANN  2,401,564
APPARATUS FOR MAKING HOLLOW THERMOPLASTIC WARE
Original Filed Aug. 16, 1940  3 Sheets-Sheet 1
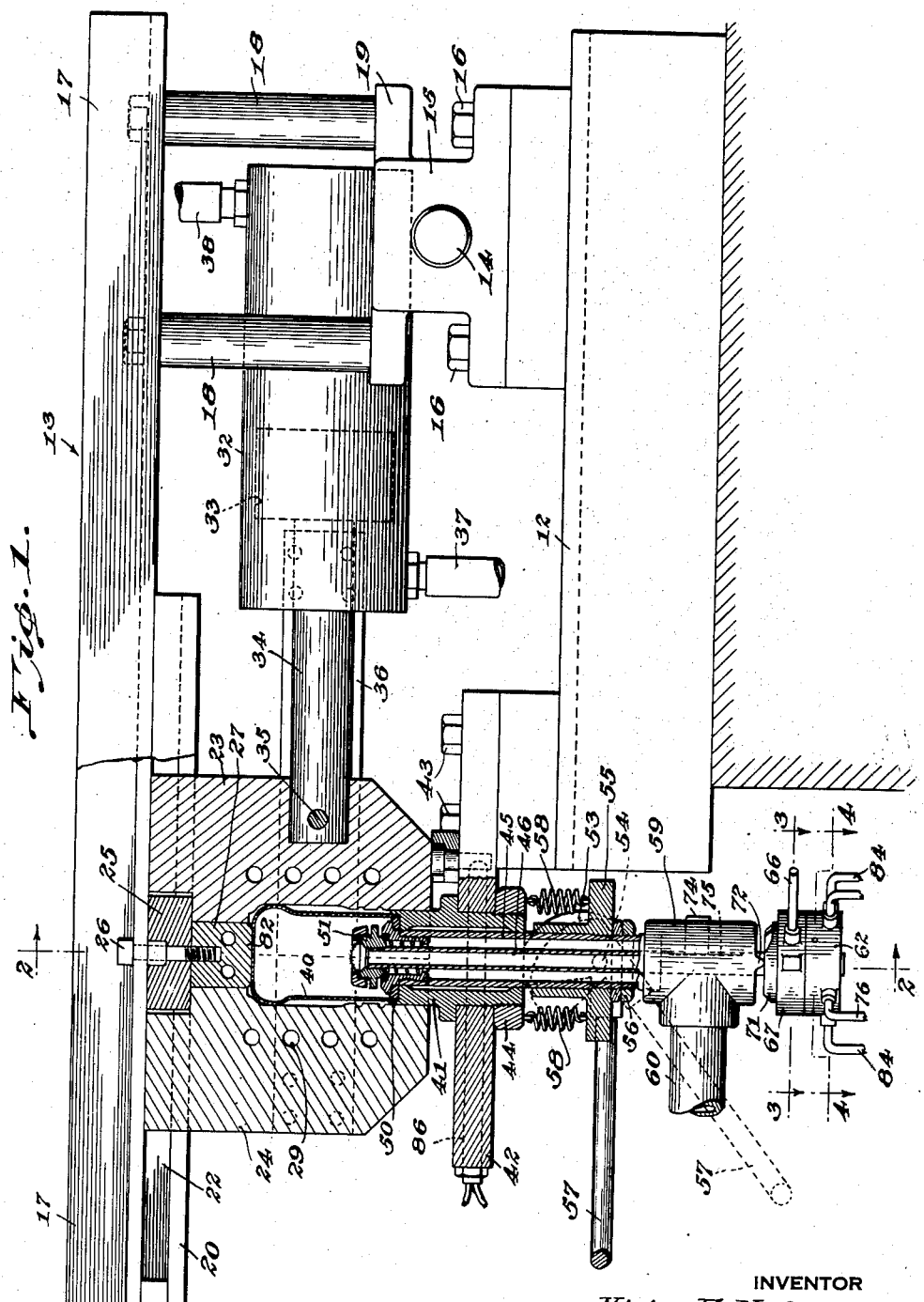
INVENTOR
Victor E. Hofmann,
BY
ATTORNEYS June 4, 1946.                V. E. HOFMANN                2,401,564
            APPARATUS FOR MAKING HOLLOW THERMOPLASTIC WARE
                Original Filed Aug. 16, 1940    3 Sheets-Sheet 2
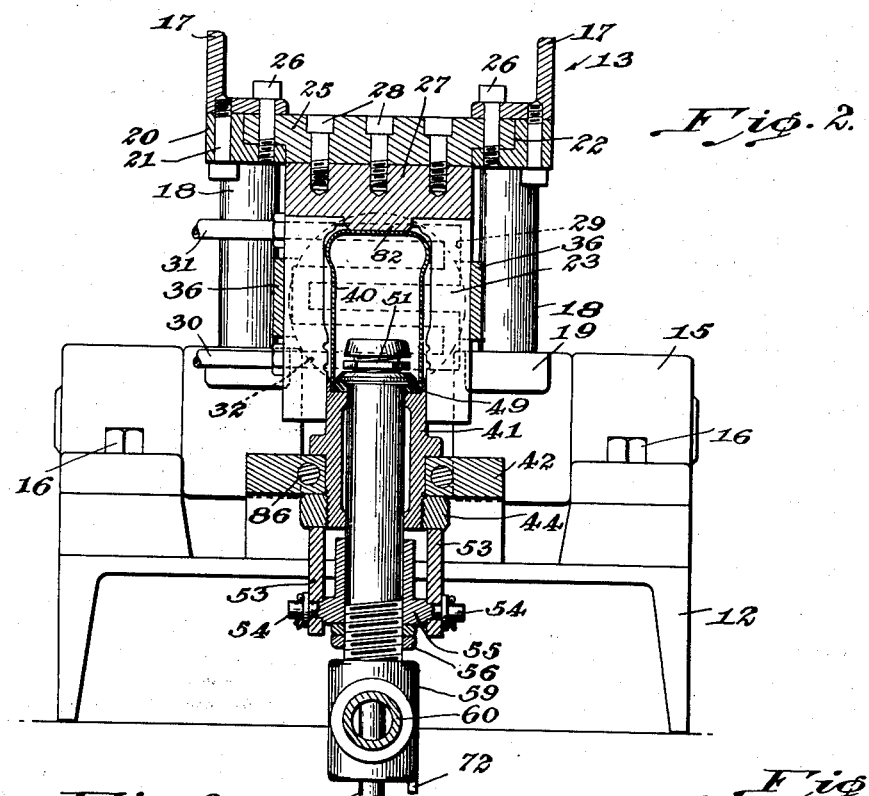
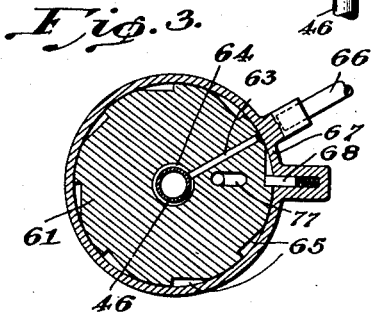
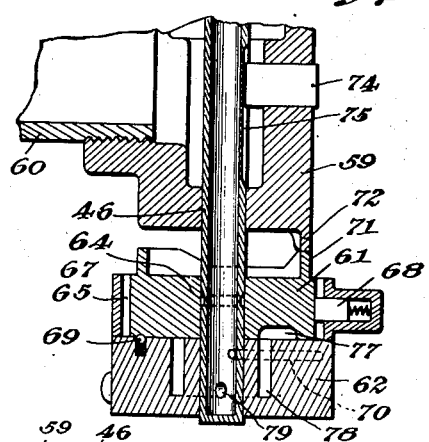
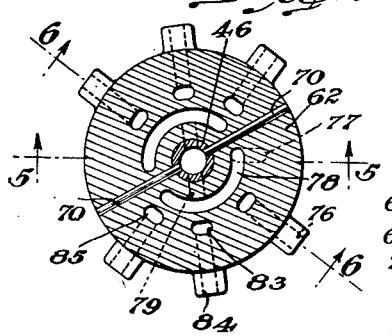
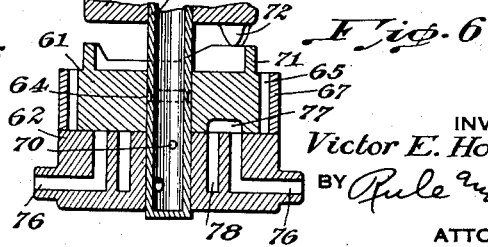
INVENTOR
Victor E. Hofmann,
BY
ATTORNEYS

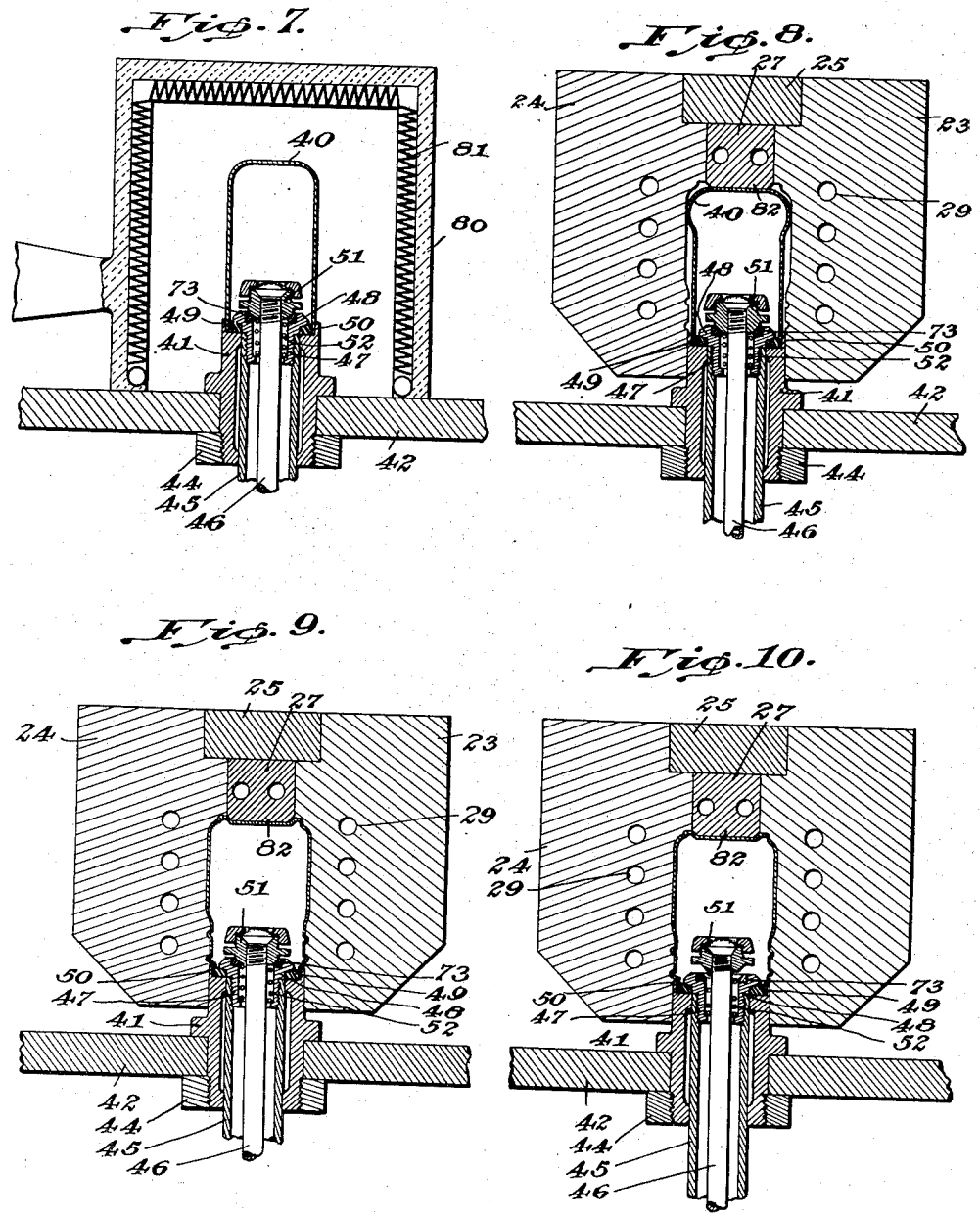

Patented June 4, 1946

2,401,564

UNITED STATES PATENT OFFICE 2,401,564

APPARATUS FOR MAKING HOLLOW THERMOPLASTIC WARE

Victor E. Hofmann, Toledo, Ohio, assignor to Owens-Illinois Glass Company, a corporation of Ohio Original application August 16, 1940, Serial No. 352,906. Divided and this application January 10, 1944, Serial No. 517,619

7 Claims. (Cl. 18—5)

My invention relates to apparatus for making hollow ware of thermoplastic materials and in the form herein illustrated, particularly to the manufacture of ware from organic thermoplastics which are softened when heat is applied and which may then be blown in molds.

One method heretofore in use for molding such articles consists in heating a preformed blank to soften the material, introducing the blank into a heated mold and blowing it therein to shape the article, then cooling the mold to harden and set the article, and thereafter removing the article from the mold. Such method is slower than is desirable owing to the considerable length of time required for cooling the mold and also is uneconomical because of the large amount of heat required for repeatedly heating the mold.

An object of the present invention is to eliminate the necessity of cooling the entire mold after forming an article with the result that the efficiency with respect to time and heat requirements is greatly increased. For the attainment of such object the present invention provides an apparatus for use in processing, in the following manner, a blank or parison of the material which has been given a preliminary formation and is herein referred to as a preform. The preform is heated to render it plastic, then introduced into a heated mold and blown to the form of the mold. A cooling liquid is then circulated within the blown article by which it is quickly chilled and hardened, permitting the mold to be opened and the blown article removed without cooling the entire mold, only a comparatively small amount of heat being extracted from the mold. The cooling action only penetrates the mold walls a comparatively short distance, permitting a quick reheating of the mold preparatory to the next succeeding operation, as well as permitting a rapid cooling and quick removal of the molded article.

Other objects of the invention will appear hereinafter.

The present application is a division of my copending application Serial No. 352,906, filed August 16, 1940, Making hollow thermoplastic ware, on which Patent No. 2,348,738 was granted May 16, 1944.

Referring to the accompanying drawings:

Fig. 1 is a longitudinal part-sectional elevation of an apparatus embodying the present invention.

Fig. 2 is a cross-sectional elevation at the line 2—2 on Fig. 1.

Fig. 3 is a section at the line 3—3 on Fig. 1 showing a rotary valve disk and its operating means.

Fig. 4 is a section at the line 4—4 on Fig. 1 showing a nonrotating valve member cooperating with the valve disk of Fig. 3.

Figs. 5 and 6 are sectional elevations at the lines 5—5 and 6—6 respectively on Fig. 4.

Figs. 7 to 10 are views illustrating successive steps in the process of fabricating a hollow article. Fig. 7 is a sectional view showing a blank or preform within the heating chamber. Fig. 8 shows the preheated blank enclosed within the mold. Fig. 9 shows the blank blown to finished form within the mold. Fig. 10 shows the inner valve member lifted to permit circulation of a cooling liquid.

Referring particularly to Figs. 1 and 2, the apparatus is mounted on a supporting frame or base 12. A horizontally disposed mold carriage 13 is mounted to rock up and down about the axis of a pivot shaft 14 journalled in bearing blocks 15 secured by bolts 16 to the base 12. The carriage 13 includes a pair of parallel angle bars 17, each of which is bolted to a pair of posts 18 rising from a supporting plate or block 19 in which the pivot shaft 14 is mounted. Beneath the angle bars 17 and extending lengthwise thereof are angle bars 20 fastened to the bars 17 by bolts 21 (Fig. 2). The angle bars 17 and 20 together form a pair of guideways 22 in which are slidably mounted mold sections 23 and 24 movable toward and from each other for closing and opening the mold.

A tie bar 25 extends transversely of the carriage 13 with each end of the bar extending between a rail 17 and the subjacent rail 20 and secured in position by bolts 26. A stop bar 27 beneath the bar 25 and extending longitudinally thereof is attached to the bar 25 by bolts 28. The stop bar 27 provides an abutment for the mold sections 23 and 24 when the mold is closed. Each mold section is formed with a channel or passageway 29 extending zig-zag therethrough and communicating at its opposite ends with pipes 30 and 31 through which steam or other fluid may be circulated for heating or regulating the temperature of the mold.

The molds are opened and closed by means of a piston motor operated by air or other fluid, said motor comprising a cylinder 32 in which reciprocates a piston 33 and piston rod 34, the latter attached to the mold section 23 by means of a pin 35. The mold section 24 is rigidly connected to the motor cylinder by a pair of straps 36. Air or other fluid for actuating the motor is supplied through pipes 37 and 38 at opposite ends of the cylinder. Assuming the mold to be open and the piston 33 adjacent the right-hand end of the cylinder (Fig. 1), closing of the mold is effected by supplying air under pressure to the pipe 38, thereby moving the mold section 23 forward until it is arrested by the stop bar 27. The mold section 24 is moved to mold closing position by the pressure in the cylinder reacting against the piston and moving the cylinder to the right, carrying with it the mold section 24.

Means for supporting a hollow blank or preform 40 while being preheated and blown to finished form comprises a tubular support or sleeve 41 which has a fixed mounting in a stationary supporting plate 42, the latter secured by bolts 43 to the frame 12. The lower end portion of the sleeve 41 is screw-threaded to receive a clamping nut or ring 44.

Mounted for a short vertical movement within the sleeve 41 is a valve cylinder 45 or tube through which extends a tubular valve stem 46 adapted for a limited up-and-down movement relative to the cylinder 45. A head 47 (see Fig. 8) has a screw-threaded connection with the cylinder 45 and is formed with an annular flange 48 to which is attached a rubber gasket 49. When a preform 40 (Fig. 7) is placed in position on the sleeve member 41, it is held against lateral displacement by an annular flange or rim 50 on the upper end of said sleeve member. After the preform is placed in position the cylinder 45 is moved downward a short distance as presently described so that the gasket 49 is compressed by the flange 48 and is also spread out radially, thus gripping the preform and providing an airtight seal between the interior of the preform and the surrounding atmosphere.

The means for moving the cylinder 45 and the head 47 downward and compressing the rubber ring 49 comprises a pair of cams 53 (Figs. 1 and 2) pivoted on trunnions 54 formed on a sleeve 55 which is threaded on the cylinder 45 and locked in position by nuts 56. An operating lever 57 is connected to the cams 53 and may be swung downward from the horizontal position, shown in full lines in Fig. 1, to the dotted line position, thereby rocking the cams into position to permit the valve cylinder to be lifted by means of coil tension springs 58 connected between the ring 44 and the sleeve 55.

A valve head 51, which also functions as a spray nozzle, is threaded on the upper end of the valve stem 46. Said head and stem have a limited up-and-down movement relative to the cylinder 45. A coil spring 52 mounted within the head 47 and held under compression, serves to lift the valve stem and head 51 relative to the cylinder 45. The valve stem extends downward through a head 59 having a fixed connection with the cylinder 45 at the lower end of said cylinder. The head 59 is mounted on a stationary pipe 60 which is open through said head to the cylinder 45 and serves as an exhaust pipe as hereinafter set forth. Connected to the valve stem below the head 59 is valve mechanism comprising a rotary valve disk 61 and a nonrotatable valve disk or member 62.

The valve disk 61 is held against movement lengthwise of the stem 46 by means of a pin 63 (Fig. 3) extending radially through the disk and engaging an annular groove 64 formed in the stem 46. The valve disk 61 is formed on its periphery with ratchet teeth 65 and is rotatable by a hand lever 66 attached to a ring 67 which surrounds the disk and carries a spring-pressed pawl or dog 68 to engage the ratchet teeth. A spring actuated detent 69 (Fig. 5) holds the valve disk against accidental rotative movement.

The lower valve member is keyed to the stem 46 by a pair of radial pins 70, preventing rotative movement of the valve member 62 and causing the valve members 61 and 62 to move up and down with the stem. Such up-and-down movement is controlled by cam means comprising an annular cam track 71 formed on the upper face of the valve disk 61 and cooperating with a cam lug 72 on the lower face of the stationary head 59. As shown in Figs. 1, 5 and 6, the lug 72 is in contact with the high portion of the cam track so that the valve mechanism, including the stem 46, is held in its lowered position. In this position the head 51 on the valve stem 46 is held downward against the head 47 on the cylinder 45, thereby closing the upper end of said cylinder. A ring gasket 73 carried on the head 47 provides a seal between the heads 47 and 51. As the valve disk 61 is rotated and carries the high portion of the cam track from beneath the lug 72, the valve stem 46 is moved upward by the spring 52, thereby lifting the valve head 51 off its seat and opening the cylinder 45 to the mold cavity. Rotation of the valve stem 46 and valve disk 62 is positively prevented by a key 74 (Fig. 5) which is carried in the head 59 and engages a groove 75 formed in the valve stem.

Air under pressure for expanding the preform 40 within the mold is supplied from any suitable source (not shown), through an air line including a channel 76 (Figs. 4, 6) extending within the valve 62 and opening into a short channel 77 in the rotary valve disk, said channel 77 opening into an arc-shaped channel 78 in the lower valve member. The channel 78 is in continuous communication with the interior of the tubular stem 46 through a port 79.

Means for heating the parison 40 preliminary to blowing it in the mold comprises a heating device in the form of a chamber 80 (Fig. 7) in which are electrical heating elements 81.

Operation

A cycle of operations is as follows:

Assuming the mold 23, 24 to be open and the carriage 13 swung upward about the axis 14, a hollow parison or preform 40 is placed in position on the holding sleeve 41 (Fig. 7). The heating chamber 80 is then positioned on the supporting plate 42 and the parison heated to make it soft and plastic. The heating chamber is now removed, the carriage 13 swung downward on its fulcrum 14 and the piston motor operated to close the mold. The lowering of the carriage 13 brings a boss 82 on the lower face of the bar 27 into position to form the upper end wall of the mold.

At the time the parison is placed in position the lever 57 (Fig. 1) is in its lowered position so that the springs 58 hold the valve cylinder 45 lifted. This permits the placing of the parison, after which the lever 57 is swung upward to the Fig. 1 position so that the cams 53 force the cylinder 45 downward, thereby clamping the parison and also making a tight seal, preventing the escape of air. The valve disk 61 is now given a step rotation, bringing it to the Fig. 6 position in which a pressure line is established through the channels 76, 77, 78, port 79 (Fig. 4) and hollow stem 46 to the nozzle or blow head 5l, thereby supplying air pressure and expanding the parison from the shape shown in Fig. 8 to its final form (Fig. 9) in the heated mold.

The valve disk 6l is now given another step movement. During this step the cam lug 72 rides off the high portion of the cam track, permitting the valve stem 46 to be lifted by the coil spring 52, thus breaking the seal between the valve heads 5l and 47. The pressure within the blown article is thus dissipated as the air is free to escape downward through the cylinder 45 to the exhaust pipe 60. As the valve disk 6l completes said last mentioned step movement, the channel 77 is brought into register with a port 83 (Fig. 4) in a water line 84 through which water is supplied and forced upwardly through the valve stem 46 and into the mold. The interior surface of the molded article is thus sprayed with cold water, quickly chilling it. The valve disk 6l is now given another step rotation, bringing the channel 77 into position to connect an air port 85 with the channel 78 so that air is again blown into the interior of the mold, thereby drying the molded article. While this is taking place the valve head 5l is still in its lifted position so that the air can escape through the exhaust pipe. The valve disk 6l may now be given another step rotation, thereby cutting off the air supply. The piston motor is now actuated to open the mold, the lever 57 is lowered, permitting the valve cylinder 45 to be lifted, the carriage l3 is swung upward, and the finished article removed. The water cooling and drying of the blown article require only a very short time so that only the interior surface portion of the mold is cooled to any appreciable degree. This permits the mold to be reheated quickly and economically.

As shown in Fig. 4 the valve member 62 may be provided with a duplicate set of ports and channels diametrically opposite those above described, permitting a cycle of operations to be effected during each half rotation of the valve disk. If desired, electrical heating elements 86 (Figs. 1 and 2) may be embedded in the plate 42 for maintaining the valve mechanism at the required temperature.

Modifications may be resorted to within the spirit and scope of my invention.

I claim:

1. The combination of a tubular supporting member having an annular supporting surface at one end thereof to provide a support for an open-ended hollow blank, a tubular valve cylinder extending through the said support, a tubular valve head on said valve cylinder, a sealing gasket of compressible and expansible material interposed between said head and said annular surface, and means for moving said cylinder and head lengthwise of said supporting member into and out of position for compressing said gasket and spreading the latter into sealing engagement with a blank on said support.

2. The combination of a tubular supporting member having an annular supporting surface at one end thereof to provide a support for an open-ended hollow blank, a tubular valve cylinder extending through the said support, a tubular valve head on said valve cylinder, a sealing gasket of compressible and expansible material interposed between said head and said annular surface, means for moving the cylinder and head lengthwise of said supporting member into and out of position for compressing said gasket and spreading the latter into sealing engagement with a blank on said support, a second valve head surmounting said first mentioned head, a stem connected to said second valve head and extending through said cylinder, means for supplying gas through said second head, and means for moving said second head into and out of sealing engagement with said first mentioned head.

3. The combination of a tubular supporting member having an annular supporting surface at one end thereof to provide a support for an open-ended hollow blank, a tubular valve cylinder extending through the said support, a tubular valve head on said valve cylinder, a sealing gasket of compressible and expansible material interposed between said head and said annular surface, means for moving said cylinder and head lengthwise of said supporting member into and out of position for compressing said gasket and spreading the latter into sealing engagement with a blank on said support, a second valve head surmounting said first mentioned head, a tubular stem connected to said second head, means for supplying a gas under pressure through said stem and second head, spring means for relatively moving said heads and spacing them apart, and means for bringing said heads together and forming a seal therebetween.

4. The combination of a tubular supporting member having an annular supporting surface at one end thereof to provide a support for an open-ended hollow blank, a mold, means for moving the mold into and out of position to enclose the blank while the latter is seated on said support, a tubular valve cylinder extending through the said support, a tubular valve head on said valve cylinder, a sealing gasket of compressible and expansible material interposed between said head and said annular surface, and means for moving the cylinder and head lengthwise of said supporting member into and out of position for compressing said gasket and spreading the latter into sealing engagement with a blank on said support.

5. The combination of a tubular supporting member having an annular supporting surface at one end thereof to provide a support for an open-ended hollow blank, a mold, means for moving the mold into and out of position to enclose the blank while the latter is seated on said support, a tubular valve cylinder extending through the said support, a tubular valve head on said valve cylinder, a sealing gasket of compressible and expansible material interposed between said head and said annular surface, means for moving the cylinder and head lengthwise of said supporting member into and out of position for compressing said gasket and spreading the latter into sealing engagement with a blank on said support, a second valve head surmounting said first mentioned head, a tubular stem connected to said second head, means for supplying a gas under pressure through said stem and second head, spring means for relatively moving said heads and spacing them apart, and means for bringing said heads together and forming a seal therebetween.

6. Apparatus for forming hollow articles of thermoplastic material, said apparatus comprising a stationary frame, a blower having a stationary mounting in said frame, a mold carriage, horizontal guideways thereon, a hollow mold mounted on the carriage and comprising separable sections slidable in said guideways to and from a mold closing position in which the blower is positioned within the mold cavity, a piston motor comprising a horizontal cylinder, piston and piston rod, said cylinder and piston rod being parallel with said guideways and having fixed connection with the mold sections respectively, and a horizontal pivot shaft extending transversely of the said motor cylinder and piston rod and pivotally connecting the mold carriage to said stationary supporting frame, the carriage being free to swing up and down about the axis of said pivot shaft.

7. Apparatus for forming hollow articles of thermoplastic material, comprising telescopic tubular valve members, a blowing head carried by the inner valve member at one end thereof and adjacent to one end of the outer valve member, means for supporting a hollow preform in position to enclose said blowing head and said end of the outer valve member and receive air supplied through said blowing head, means for supplying blowing air through said inner valve member to the blowing head, means for exhausting the air through the outer valve member, a sealing ring interposed between said blowing head and said end of the outer valve member, and means for relatively moving said members lengthwise and thereby clamping the sealing ring between the blowing head and said end of the outer valve member and cutting off the interior of the article from the exhaust.

VICTOR E. HOFMANN.